US011571867B2

(12) United States Patent
Amurri (10) Patent No.: US 11,571,867 B2
(45) Date of Patent: Feb. 7, 2023

(54) APPARATUS FOR BUILDING AND FOR CHECKING A CONTINUOUS ELONGATED ELEMENT OF A TYRE FOR VEHICLE WHEELS

(71) Applicant: PIRELLI TYRE S.P.A., Milan (IT)

(72) Inventor: Cesare Emanuele Amurri, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 17/348,311

(22) Filed: Jun. 15, 2021

(65) Prior Publication Data
US 2021/0308972 A1   Oct. 7, 2021

Related U.S. Application Data

(63) Continuation of application No. 16/468,252, filed as application No. PCT/IB2017/057635 on Dec. 5, 2017, now Pat. No. 11,104,088.

(30) Foreign Application Priority Data

Dec. 16, 2016   (IT) .......................... 102016000127724

(51) Int. Cl.
| B29D 30/00 | (2006.01) |
| B29C 48/08 | (2019.01) |
| B29D 30/16 | (2006.01) |
| B29D 30/28 | (2006.01) |
| B29D 30/62 | (2006.01) |

(52) U.S. Cl.
CPC .......... *B29D 30/0061* (2013.01); *B29C 48/08* (2019.02); *B29D 30/16* (2013.01); *B29D 30/28* (2013.01); *B29D 30/62* (2013.01); *B29D 2030/0066* (2013.01); *B29D 2030/1664* (2013.01)

(58) Field of Classification Search
None
See application file for complete search history.

(56) References Cited

U.S. PATENT DOCUMENTS 10,836,129 B2 *  11/2020   Sangiovanni ...... B29D 30/3028
10,899,095 B2 *   1/2021   Marchini ............... B29D 30/08
11,104,088 B2     8/2021   Amurri
(Continued)

OTHER PUBLICATIONS

Chinese Second Office Action for CN Application No. 201780083735.7 filed Dec. 5, 2017, on behalf of Pirelli Tyre S.P.A. dated Aug. 27, 2021. CN Original + English Summary. 10 Pages.

*Primary Examiner* — Peter J Macciarolo
*Assistant Examiner* — Jermaine L Jenkins
(74) *Attorney, Agent, or Firm* — Steinfl + Bruno LLP (57) ABSTRACT

An apparatus for building and for checking a continuous elongated element during the building of a tyre for vehicle wheels. A beam of an electromagnetic radiation is projected on a section of the continuous elongated element dispensed by a dispensing head and interposed between the dispensing head and a first contact area of the continuous elongated element with a radially outer surface of a tyre being processed. An image of a radiation reflected by the section is acquired. A first parameter related to the image is detected, and the first parameter is compared with a second reference parameter.

13 Claims, 8 Drawing Sheets

(56) References Cited

U.S. PATENT DOCUMENTS

| | | | |
|---|---|---|---|
| 2009/0283203 A1* | 11/2009 | Marchini | B29C 43/245 |
| | | | 156/117 |
| 2016/0263849 A1* | 9/2016 | Cicognani | B29D 30/30 |
| 2019/0184657 A1* | 6/2019 | Benzing, II | B29D 30/62 |
| 2020/0070454 A1 | 3/2020 | Amurri | |

* cited by examiner

APPARATUS FOR BUILDING AND FOR CHECKING A CONTINUOUS ELONGATED ELEMENT OF A TYRE FOR VEHICLE WHEELS

CROSS-REFERENCE TO RELATED APPLICATIONS

The present application is the continuation of U.S. patent application Ser. No. 16/468,252 filed on Jun. 10, 2019, which is the U.S. National Stage of International Patent Application No. PCT/IB2017/057635 filed on Dec. 5, 2017, which, in turn, claims priority to Italian Patent Application No. 102016000127724 filed on Dec. 16, 2016, all of which are incorporated herein by reference in their entireties.

TECHNICAL FIELD OF THE INVENTION

The object of the present invention is a method for checking a continuous elongated element during the building of a tyre for vehicle wheels. The present invention is situated in the field of processes and apparatuses for building tyres for vehicle wheels. In particular, the present invention is situated in the field of methods adapted for controlling and checking the correct assembly on a forming drum of the components intended to form the tyre.

STATE OF THE ART

A tyre for vehicle wheels generally comprises a carcass structure comprising at least one carcass ply having end flaps engaged with respective anchoring annular structures. In radially outer position with respect to the carcass structure, a belt structure is associated comprising one or more belt layers, situated in radial superimposition with respect to each other and with respect to the carcass ply, having textile or metallic reinforcement cords with cross orientation and/or substantially parallel to the circumferential extension direction of the tyre. In radially outer position with respect to the belt structure, a tread band is applied, it too made of elastomeric material like other semi-finished products constituting the tyre. Respective sidewalls made of elastomeric material are also applied on the lateral surfaces of the carcass structure, each extended from one of the lateral edges of the tread band up to the respective anchoring annular structure to the beads. In the tyres of "tubeless" type, the carcass ply is internally covered by a layer of elastomeric material, preferably with butyl base, normally termed "liner" having optimal characteristics of impermeability to air and extending from one side of the beads to the other.

The production cycles of a tyre provide that, following a building process in which the various structural components of the tyre itself are made and/or assembled, the built green tyres are transferred into a moulding and vulcanisation line where a moulding and vulcanisation process is actuated that is adapted to define the structure of the tyre according to a desired geometry and tread pattern.

With the term "elastomeric material" it is intended to indicate a composition comprising at least one elastomeric polymer and at least one reinforcement filler. Preferably, such composition also comprises additives such as a crosslinking agent and/or a plasticising agent. Due to the presence of the crosslinking agent, by means of heat such material can be crosslinked, so as to form the final manufactured product.

By "continuous elongated element" it is intended a cordon or a strip of elastomeric material provided with reinforcement cords (or not provided therewith). If present, the cords can be textile or metallic, they are immersed in the elastomeric material and extend continuously each other side-by-side and parallel for the entire longitudinal extension of the continuous elongated element. Preferably, the continuous elongated element comprises elastomeric material only.

By "tyre being processed" it is intended a radially outer surface of a forming drum carrying (or not carrying) any one portion of the tyre.

The terms "radial" and "axial" and the expressions "radially inner/outer" and "axially inner/outer" are used by making reference respectively to a direction perpendicular and to a direction parallel to the rotation axis of the tyre being processed. A plane is defined "radial" when it comprises the rotation axis of the tyre.

The terms "circumferential" and "circumferentially" are instead used by making reference to the direction of the annular extension of the tyre being processed.

By "light radiation" it is intended an electromagnetic radiation which has at least one portion of the spectrum falling within a widened range of the optical band, and not necessarily strictly falling within the optical band (i.e. with a wavelength comprised in the 400 nm-700 nm interval), for example such widened range of the optical band can extend from the ultraviolet to the infrared (e.g. with a wavelength comprised between about 100 nm and about 1 μm).

The document WO 2011/007269, on behalf of the same Applicant, illustrates a process for assembling components of a tyre on a forming support, in which a continuous elongated element of elastomeric material is fed by an extruder and applied in coils that are side-by-side or in part superimposed on the forming support. An application device provided with a roller applies the continuous elongated element on the support.

The document EP 2 613 122 illustrates the application of a shaped element such as a band on a building drum in order to form a component of a tyre. The length of such band is substantially equal to the circumferential extension of the drum. Once the band is wound on the drum, a head portion and an end portion of such band abut against each other or are superimposed, forming a junction. A device provided with laser unit and cameras is able to detect the length of the band and the size of the junction.

The document WO 2010/13553 illustrates a test device comprising illuminating means and a camera positioned at a forming drum on which a carcass ply is formed. The illuminating means illuminate the elements placed at an edge of the carcass ply, the camera captures an image thereof. A processing unit detects the most illuminated portions of the image and operates to compare the positions of such more illuminated portions and the reference positions in order to determine if the elements of such edge are correctly situated.

SUMMARY

In such context, the Applicant has observed the need to improve the quality of the tyres produced and to ensure greater compliance of the same to design specifications, in particular tyres whose components are obtained by means of dispensing and winding of a continuous elongated element on a tyre being processed.

The Applicant has in fact observed that the characteristics (such as the position, the shape and the size) of a component of the tyre formed by means of winding of a continuous elongated element can be different from those of design.

The Applicant has observed that such deviation can involve the formation of a component that falls outside design specifications and hence of a tyre having one or more non-compliance issues with such specifications.

The Applicant has further observed that such non-compliance issues are hard to verify once the tyre is built, if not with invasive methods, so that it is even possible that the defects are only detected by the final user since they affect the road behaviour of such tyre.

The Applicant has perceived that such non-compliance issues can depend on what occurs, during winding, upstream of a first contact area of the elongated element with the tyre being processed, i.e. between a dispensing head of the abovementioned elongated element and said area.

The Applicant has in particular perceived that such non-compliance issues can depend on a variation of the geometry of the continuous elongated element which is fed towards the tyre being processed.

For example, the Applicant has verified that if the width of the continuous elongated element, which is wound in side-by-side coils to form the under-layer of the tread, is reduced with respect to the design width, spaces remain between one coil and the adjacent one. Therefore, an irregular surface is formed on which the tread is deposited. The tread masks the irregular distribution of the under-layer and makes the detection of the defect via visual control difficult.

In such context, the Applicant has therefore felt the need to control the geometry of the continuous elongated elastomeric elements before they are deposited on the tyre being processed.

In particular, the Applicant has perceived that it is better to carry out such control immediately before the deposition of the continuous elongated element on the tyre being processed.

The Applicant has therefore found that, by monitoring the geometry of the continuous elongated element, preferably its width, in a section interposed between a dispensing head and a first contact area of such elongated element with the tyre being processed, it is possible to check a priori if the element will be correctly deposited and hence if the component that will be formed will be compliant with the design specifications.

According to one aspect, the present invention therefore regards a method for checking a continuous elongated element during the building of a tyre for vehicle wheels.

Preferably, provision is made for setting a forming drum in rotation around a rotation axis thereof.

Preferably, provision is made for dispensing, from a dispensing head, a continuous elongated element for building at least one component of a tyre being processed carried by said forming drum winding said continuous elongated element according to side-by-side and/or radially superimposed coils.

Preferably, provision is made for projecting at least one beam of an electromagnetic radiation on a section of said continuous elongated element dispensed by said dispensing head and interposed between the dispensing head and a first contact area of the continuous elongated element with a radially outer surface of said tyre being processed.

Preferably, provision is made for detecting at least one radiation reflected by said section in order to determine a first parameter related to a geometrical dimension of said continuous elongated element.

Preferably provision is made for comparing said first parameter with a second reference parameter.

According to a different aspect, the present invention regards a process for building a tyre for vehicle wheels.

Preferably, provision is made for dispensing continuously a continuous elongated element from a dispensing head up to a first contact area of said continuous elongated element with a radially outer surface of a tyre being processed carried by a forming drum.

Preferably, provision is made for setting the forming drum in rotation around a rotation axis thereof, in order to wind the continuous elongated element on the radially outer surface of said tyre being processed.

Preferably, provision is made for controlling a width of the continuous elongated element on a section of said continuous elongated element interposed between the dispensing head and the first contact area.

Preferably, provision is made for performing such control in accordance with the method of the preceding aspect and/or of one or more of the following aspects.

According to a different aspect, the present invention regards an apparatus for building a tyre for vehicle wheels.

Preferably, a forming drum is provided that is configured to rotate around a rotation axis thereof.

Preferably, a dispensing head is provided that is placed at said forming drum and configured for continuously dispensing a continuous elongated element up to a first contact area of said continuous elongated element with a radially outer surface of a tyre being processed carried by said forming drum.

Preferably, a motor is provided that is connected to the forming drum for setting it into rotation around said rotation axis in order to wind the continuous elongated element on said radially outer surface according to side-by-side and/or radially superimposed coils.

Preferably, a control device is provided that is operatively active between the dispensing head and the first contact area.

Preferably, the control device comprises at least one emitter of at least one beam of an electromagnetic radiation facing towards a section of the continuous elongated element.

Preferably, the control device comprises at least one sensor facing towards said section and configured for detecting at least one radiation reflected by said section.

Preferably, the control device comprises a control unit operatively connected at least to said at least one sensor and configured for determining a first parameter related to a geometrical dimension of the continuous elongated element and for comparing said first parameter with a second reference parameter.

The Applicant deems that the present invention allows checking, by means of an in-line control, the compliance of the built tyres without having to carry out visual controls on each tyre and/or random controls of destructive type and/or analyses of the tyres themselves (e.g. radiographic) for defects due to the size of one or more continuous elongated elements before the deposition on said tyre being processed.

The Applicant also deems that the present invention allows knowing a priori the tyres that are not compliant and the extent of the non-compliance with the design specifications so as to decide if such tyres must be discarded or not.

The Applicant further deems that the present invention allows performing such control in line with a relatively simple and inexpensive instrumentation, said instrumentation also having little bulk, such to not affect the structure and placement of the other elements that constitute said apparatus and to be able to install also on already-existing apparatuses.

The present invention, in at least one of the aforesaid aspects, can have one or more of the preferred characteristics that are described hereinbelow.

Preferably, detecting said at least one reflected radiation comprises acquiring at least one image of said at least one radiation reflected by said section.

Preferably, said sensor, detecting said at least one reflected radiation, acquires at least one image of said at least one radiation reflected by said section.

Preferably, said control device is configured for checking a width of the continuous elongated element before its deposition on said tyre being processed.

Preferably, said at least one beam intercepts lateral longitudinal edges of the continuous elongated element.

Preferably, said at least one image comprises two ends corresponding to said lateral longitudinal edges, in which the first parameter is related to a distance between said two ends.

The reflected image terminates at the lateral longitudinal edges which indicate, with sufficient precision, the width of the continuous elongated element.

Preferably, the electromagnetic radiation is a light radiation, more preferably a laser radiation.

Preferably, said at least one emitter is a light radiation projector, more preferably it projects a laser beam.

The reflected image is therefore evident and easily recognisable even to the naked eye, so as to be able to easily check the system operations.

Preferably, provision is made for acquiring said at least one image through a camera.

Preferably, the sensor comprises a camera.

The reflected image can be acquired by means of a camera, e.g. CCD, that is relatively inexpensive.

Preferably, the camera frames a coverage area and the reflected image is contained in an analysed area contained in said coverage area. The analysed area is more limited than the coverage area in order to prevent analysing other images reflected by other elements of the apparatus, such as by the forming drum.

Preferably, said at least one beam of electromagnetic radiation is substantially flat and extends transversely with respect to a feeding direction of the continuous elongated element in said section so that, preferably, said image is substantially defined by at least one transverse line.

Such transverse line substantially extends as the width of the continuous elongated element and already provides an indication visible to the naked eye.

Preferably, provision is made for projecting a first beam and a second beam respectively towards a first lateral longitudinal edge and towards a second longitudinal lateral edge of the continuous elongated element.

In this manner, the end points placed on the longitudinal edges are more evident by means of the reflected images and the detection of the width is more precise. Preferably, the first beam and the second beam are substantially flat and extend transversely with respect to a feeding direction of the continuous elongated element in said section, so that said image is substantially defined by a first transverse line and by a second transverse line.

Preferably, the first transverse line and the second transverse line are separate, in which the first transverse line comprises a first end of said two ends and the second transverse line comprises a second end of said two ends.

The use of two beams and two reflected lines allows ensuring the definition of the longitudinal edges.

Preferably, said at least one beam of electromagnetic radiation identifies at least one emission direction.

Preferably, said at least one emitter defines an emission direction of the beam thereof.

Preferably, the acquisition of said at least one image is performed along at least one acquisition direction.

Preferably, said at least one sensor defines an acquisition direction of the image.

Preferably, the emission direction and said at least one acquisition direction are tilted with respect to each other.

The relative position between the two emission and acquisition lines is selected so as to optimise the detection of the image compatibly with the spaces available, in order to place the emitter or the emitters and the sensor.

The relative position between the two emission and acquisition lines is also selected so that other images reflected by parts of the apparatus, such as by the forming drum, do not interfere with the acquisition of the image on the continuous elongated element.

Preferably, the emission direction lies in a plane perpendicular to a feeding direction of the continuous elongated element along said section.

In this manner, the reflected image is the most brilliant possible and hence detectable with greater precision.

Preferably, said acquisition direction lies in an acquisition plane perpendicular to a plane of advancement of the continuous elongated element and parallel to a feeding direction of the continuous elongated element along said section.

Preferably, the acquisition direction is tilted with respect to the advancement plane of the continuous elongated element by an angle different from 90°.

Preferably, the first beam and the second beam respectively identify a first emission direction and a second emission direction.

Preferably, a first emitter defines a first emission direction of the beam thereof and a second emitter defines a second emission direction of the beam thereof.

Preferably, the first emission direction and the second emission direction lie in a plane perpendicular to a feeding direction of the continuous elongated element along said section.

Preferably, the first emission direction impinges on the first longitudinal lateral edge and the second emission direction impinges on the second longitudinal lateral edge.

Preferably, the first emission direction is substantially perpendicular to the first longitudinal lateral edge and the second emission direction is substantially perpendicular to the second longitudinal lateral edge.

The orientation of the emission directions is such to underline, in an optimal manner, the reflected images and in particular their definition on the longitudinal edges.

Preferably, the first parameter is the distance between said two ends detected along a fixed direction in a reference system of the camera.

Preferably, the fixed direction is a horizontal direction in the reference system of the camera.

Preferably, in the reference system of the camera, the horizontal direction is perpendicular to parallel and vertical reference straight lines, each passing through one of the two ends.

The measurement carried out is therefore not an absolute measurement of the width of the continuous elongated element but a width taken along a predefined direction in the reference system of the camera.

Preferably, the first parameter is detected continuously during the dispensing of the continuous elongated element.

Preferably, the first parameter is detected starting from an instant after a first startup time interval.

Preferably, the value of said second reference parameter is calculated by detecting said distance and averaging it during a time interval after a first startup time interval.

Preferably, the value of said second reference parameter is calculated in conditions of dispensing head not obstructed in a controlled cycle.

Preferably, comparing comprises: checking whether the value of the first parameter falls within a tolerance range placed around the value of the second parameter.

Preferably, provision is made for emitting an alert signal each time that the value of the first parameter exits from the tolerance range.

The control carried out is therefore of relative type.

This solution allows avoiding the obtainment of an absolute and extremely precise measurement of the width of the continuous elongated element. The quality of the control is therefore not negatively affected by a rough pointing of the emitters and of the sensor and not even by the trapezoid shape of the section detected by the sensor.

Preferably, the alert signal is visual and/or sound.

Preferably, provision is made for reporting a non-compliance if the value of the first parameter exits at least once from the tolerance range for a period of time longer than a preset value.

Preferably, the value of the first parameter is recorded in a file and wherein reporting a non-compliance comprises marking the file as non-compliant.

Therefore, the non-compliance requires that the width exit from the tolerance range for a time (and hence for a length of the continuous elongated element) greater than a minimum predefined value. Width variations outside the band which are however limited in length, and thus are acceptable, do not generate non-compliance signals.

Preferably, with respect to a feeding direction of the continuous elongated element in said section, the emitter is interposed between the dispensing head and the first contact area.

Preferably, said at least one sensor is radially more external than the dispensing head with respect to said rotation axis.

Preferably, said at least one sensor is positioned upstream of said dispensing head with respect to an advancing sense of the continuous elongated element along said section.

Preferably, said at least one emitter is radially more external than the dispensing head with respect to said rotation axis.

Preferably, the apparatus comprises a first emitter and a second emitter, respectively facing towards a first lateral longitudinal edge and towards a second longitudinal lateral edge of the continuous elongated element.

Preferably, the apparatus comprises an applicator device comprising a pressing element operatively active in the first contact area. Preferably, the pressing element is configured for pressing a portion of the continuous elongated element against the radially outer surface while the continuous elongated element dispensed is deposited on the tyre being processed.

Preferably, said at least one emitter is radially more external than the applicator element with respect to the rotation axis.

Preferably, said at least one emitter is positioned substantially on the side of the applicator device.

Preferably, the apparatus comprises a first emitter and a second emitter placed on opposite sides of the applicator device.

Preferably, the acquisition direction passes between the dispensing head and the applicator device.

The control device according to the invention is structured and positioned in a manner such to not interfere with other elements of the apparatus and in any case to effectively perform the control.

Preferably, said at least one sensor is facing towards one face of the continuous elongated element.

Preferably, the apparatus comprises a support frame carrying said at least one emitter and the sensor.

Preferably, the support frame comprises a first device for adjusting the position of the sensor.

Preferably, the support frame comprises second devices for adjusting the position of said at least one emitter.

Preferably, the first adjusting device is configured for varying the position of the sensor along a curved path, so as to maintain the acquisition direction substantially pointed on the reflected image.

Preferably, the continuous elongated element has a flattened cross section, preferably with tapered opposite ends, so that the longitudinal edges are sloping.

Preferably, the continuous elongated element has a cross section with lenticular shape.

Preferably, the continuous elongated element has a design width comprised between circa 15 mm and circa 25 mm.

Preferably, the continuous elongated element is extruded from the dispensing head.

Preferably, the apparatus comprises an extruder and the dispensing head is the opening of said extruder.

In this case, the possible width variations to keep under control may be due to the partial obstruction of the opening of the extruder.

Preferably, a length of said section comprised between the dispensing head and the area of application is comprised between circa 15 mm and circa 30 mm.

Further characteristics and advantages will be clearer from the detailed description of a preferred but not exclusive embodiment of a method for checking a continuous elongated element according to the present invention in an apparatus and in a process for building tyres for vehicle wheels.

DESCRIPTION OF THE DRAWINGS

Such description will be set forth hereinbelow with reference to the enclosed drawings, provided only as a non-limiting example, in which.

DETAILED DESCRIPTION

Figure 1:
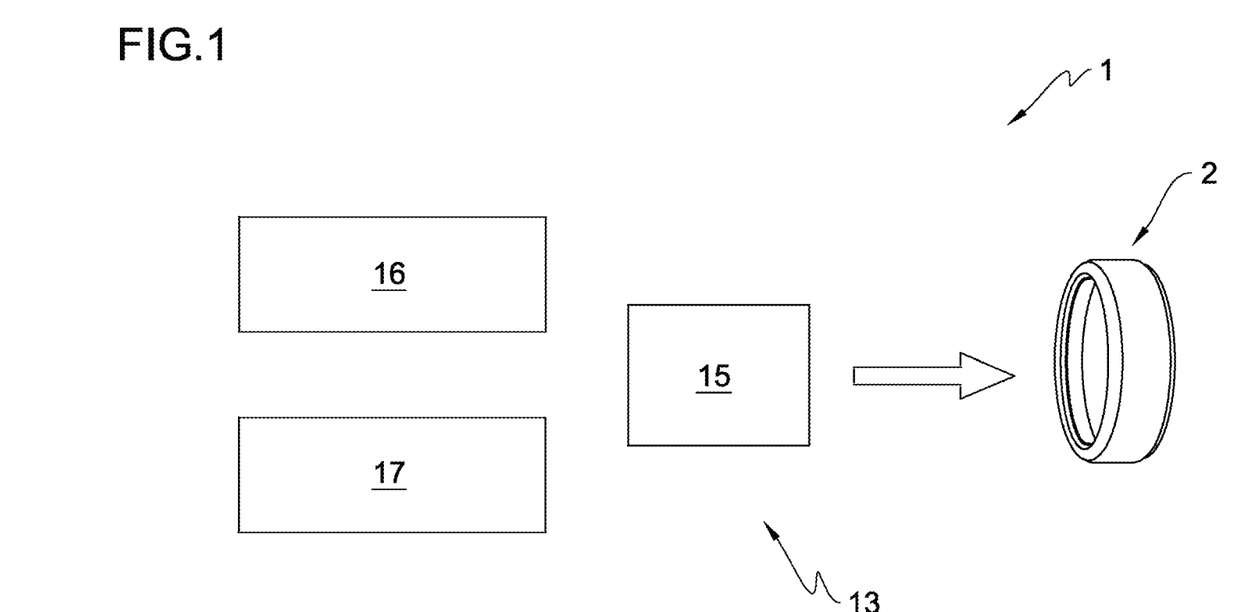
FIG. 1 schematically shows a plant for making tyres for vehicle wheels comprising an apparatus for building tyres according to the present invention.

With reference to FIG. 1, reference number 1 overall indicates a plant for making tyres 2 for vehicle wheels.

Figure 2:
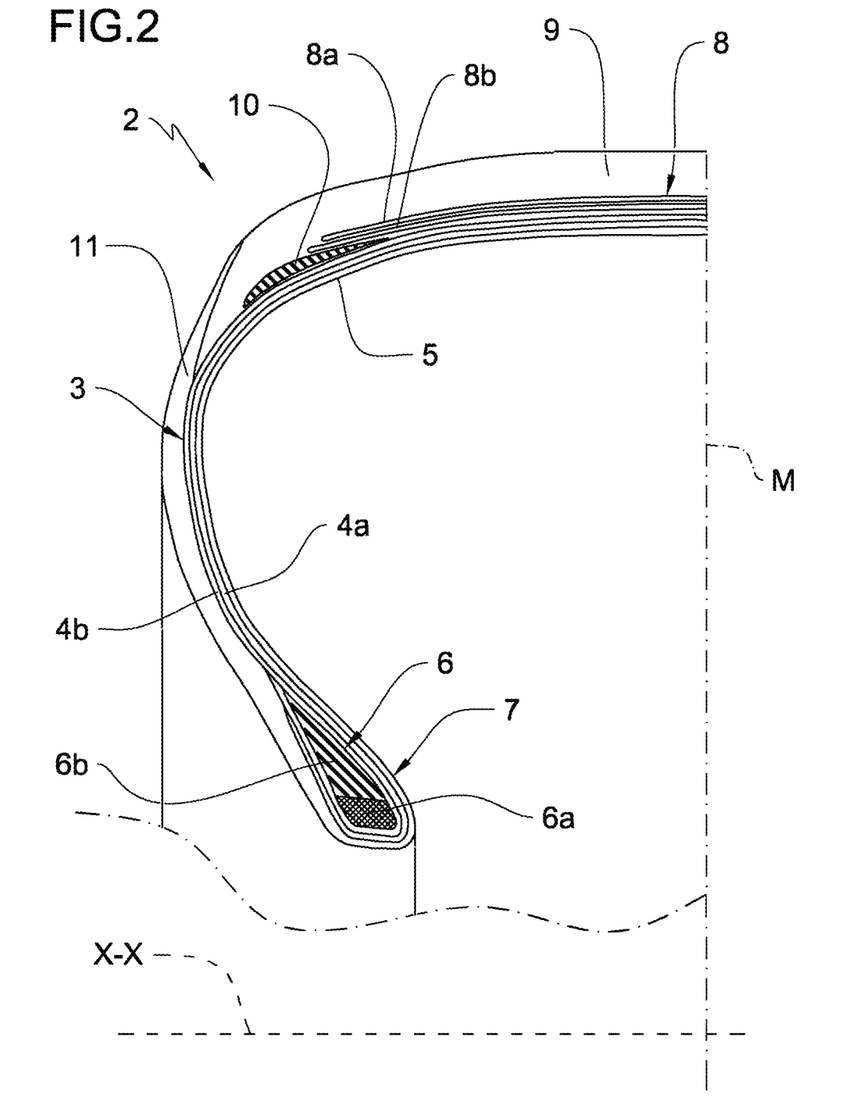
FIG. 2 is a radial half-section of a tyre for vehicle wheels made according to the process and with the apparatus of the present invention.

A tyre 2, made in said plant 1 is illustrated in FIG. 2 and essentially comprises a carcass structure 3 having two carcass plies 4a, 4b. An impermeable layer of elastomeric material or so-called liner 5 is applied inside the carcass ply/plies 4a, 4b. Two anchoring annular structures 6, each comprising a so-called bead core 6a carrying an elastomeric filler 6b in radially outer position, are engaged with respective end flaps of the carcass ply/plies 4a, 4b. The anchoring annular structures 6 are integrated in proximity to areas normally identified with the name "beads" 7, at which the engagement between the tyre 2 and a respective mounting rim (not illustrated) normally occurs. A belt structure 8 comprising one or more belt layers 8a, 8b, situated in radial superimposition with respect to each other and having textile or metallic reinforcement cords with cross orientation and/or substantially parallel to the circumferential extension direction of the tyre, is circumferentially applied around the carcass ply/plies 4a, 4b, and a tread band 9 is circumferentially superimposed on the belt structure 8. So-called "under-belt inserts" 10 can be associated with the belt structure 8; each of such inserts 10 is situated between the carcass ply/plies 4a, 4b and one of the axially opposite terminal edges of the belt structure 8. Two sidewalls 11, each extended from the corresponding bead 7 to a corresponding lateral edge of the tread band 9, are applied in laterally opposite positions on the carcass plies 4a, 4b.

The plant 1 illustrated in FIG. 1 provides for a production line 13 for tyres 2 comprising a carcass building line 16, an outer sleeve building line 17, and at least one moulding and vulcanisation unit 15 operatively arranged downstream of the aforesaid building lines.

In the non-limiting embodiment of the plant 1 illustrated in FIG. 1, in the carcass building line 16, forming drums, not illustrated, are moved between different semi-finished product dispensing stations arranged to form, on each forming drum, a carcass sleeve comprising the carcass plies 4a, 4b, the liner 5, the anchoring annular structures 6 and possibly at least one part of the sidewalls 11. Simultaneously, in the outer sleeve building line 17, one or more auxiliary drums, not illustrated, are sequentially moved between different work stations arranged to form, on each auxiliary drum, an outer sleeve comprising at least the belt structure 8, the tread band 9, and possibly at least one part of the sidewalls 11. The production line 13 also comprises an assembly station, not illustrated, at which the outer sleeve is coupled to the carcass sleeve.

In other embodiments of the plant 1, not illustrated, the building lines can be of different type, for example arranged to form all the aforesaid components on a single drum by means of suitable building devices.

The built tyres 2 are then transferred to the moulding and vulcanisation unit 15.

Figure 4:
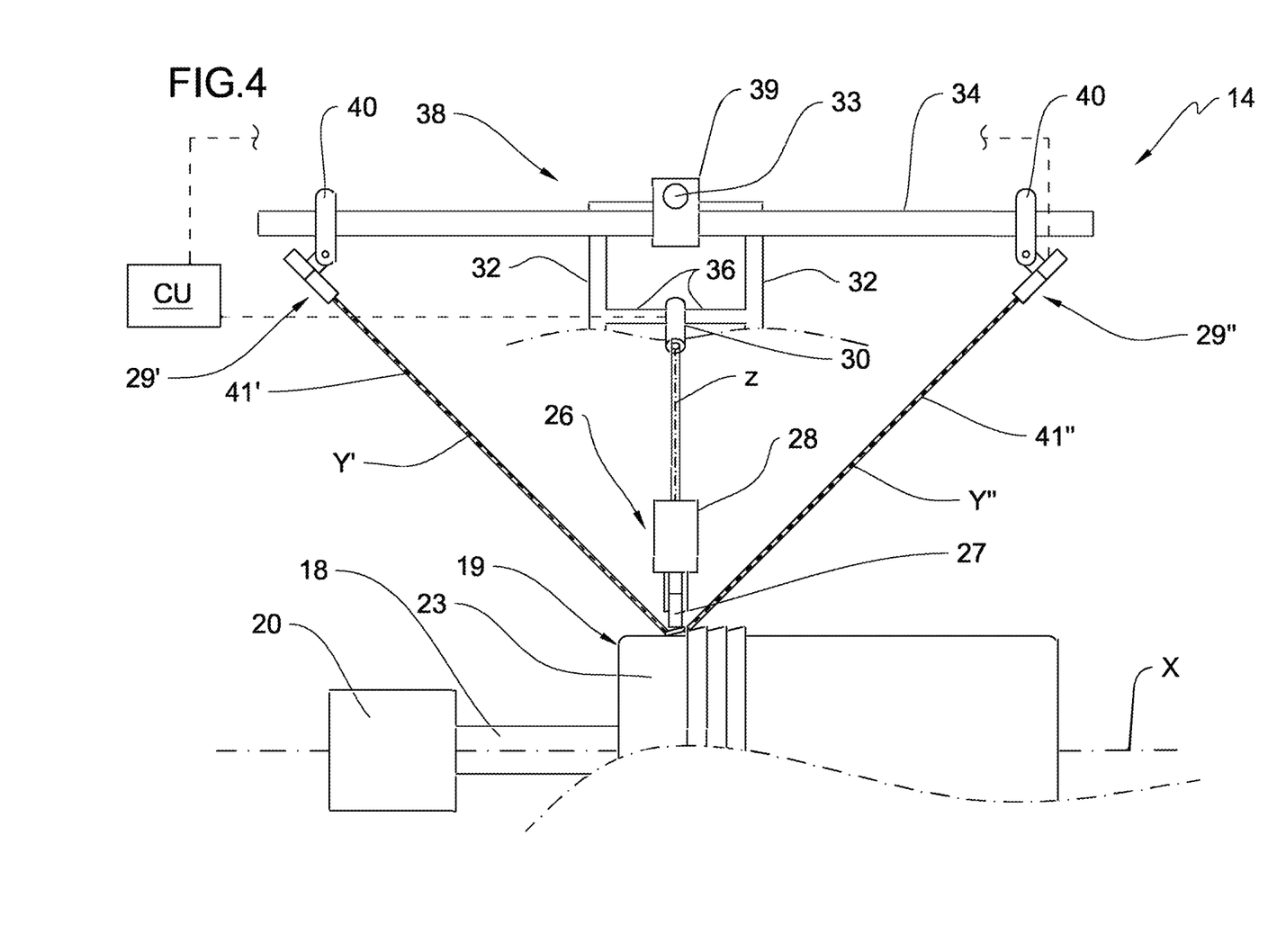
FIG. 4 illustrates a front view of the portion of FIG. 3.

According to that schematically illustrated in FIG. 4, an apparatus 14 for building the tyres 2 belonging to any one of the above-illustrated building lines, comprises a support member 18 for a forming drum 19. The support member 18 is connected to a motor 20 configured for setting the forming drum 19 in rotation around a rotation axis thereof "X".

Figure 3:
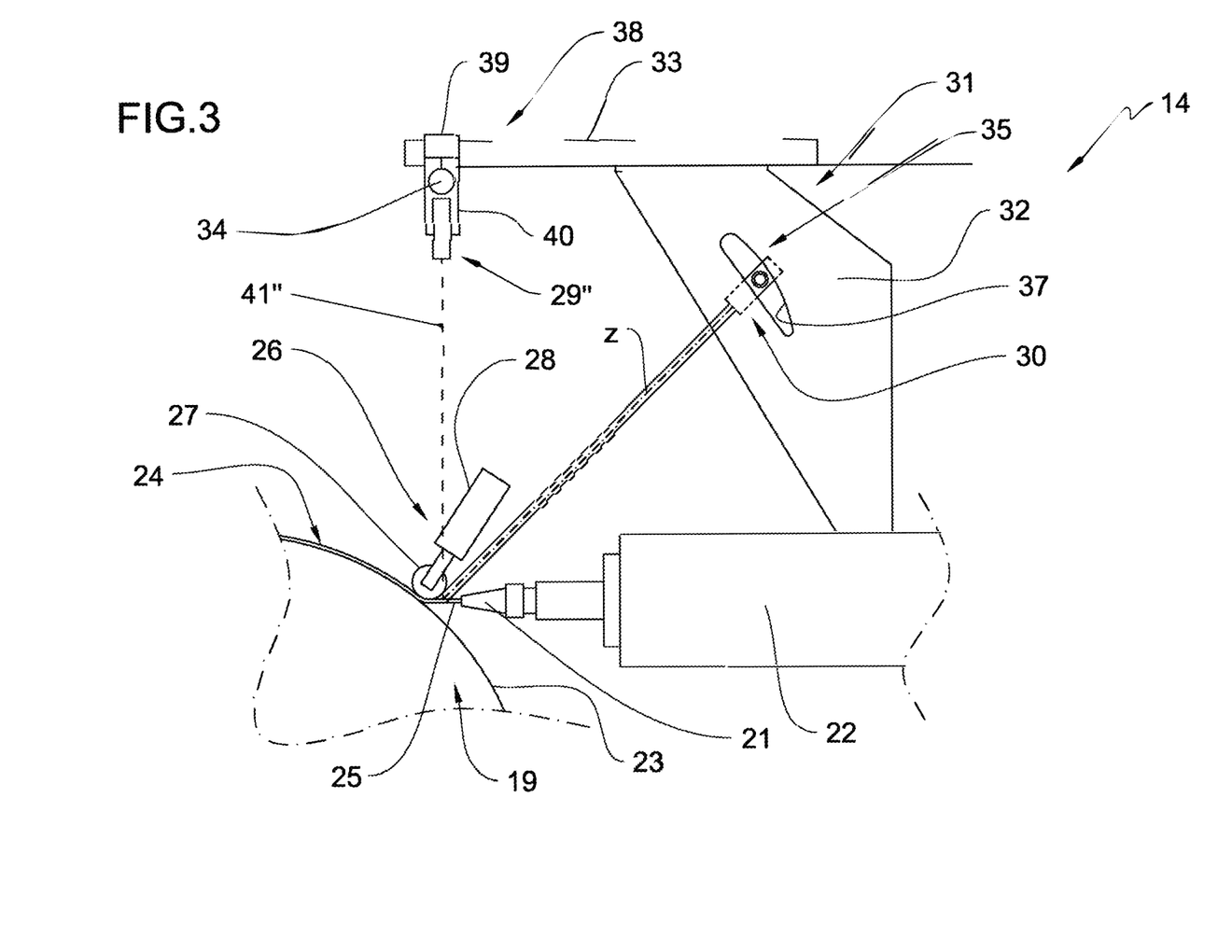
FIG. 3 illustrates a side view of a portion of an apparatus for building tyres provided with a control device according to the present invention.
Figure 5:
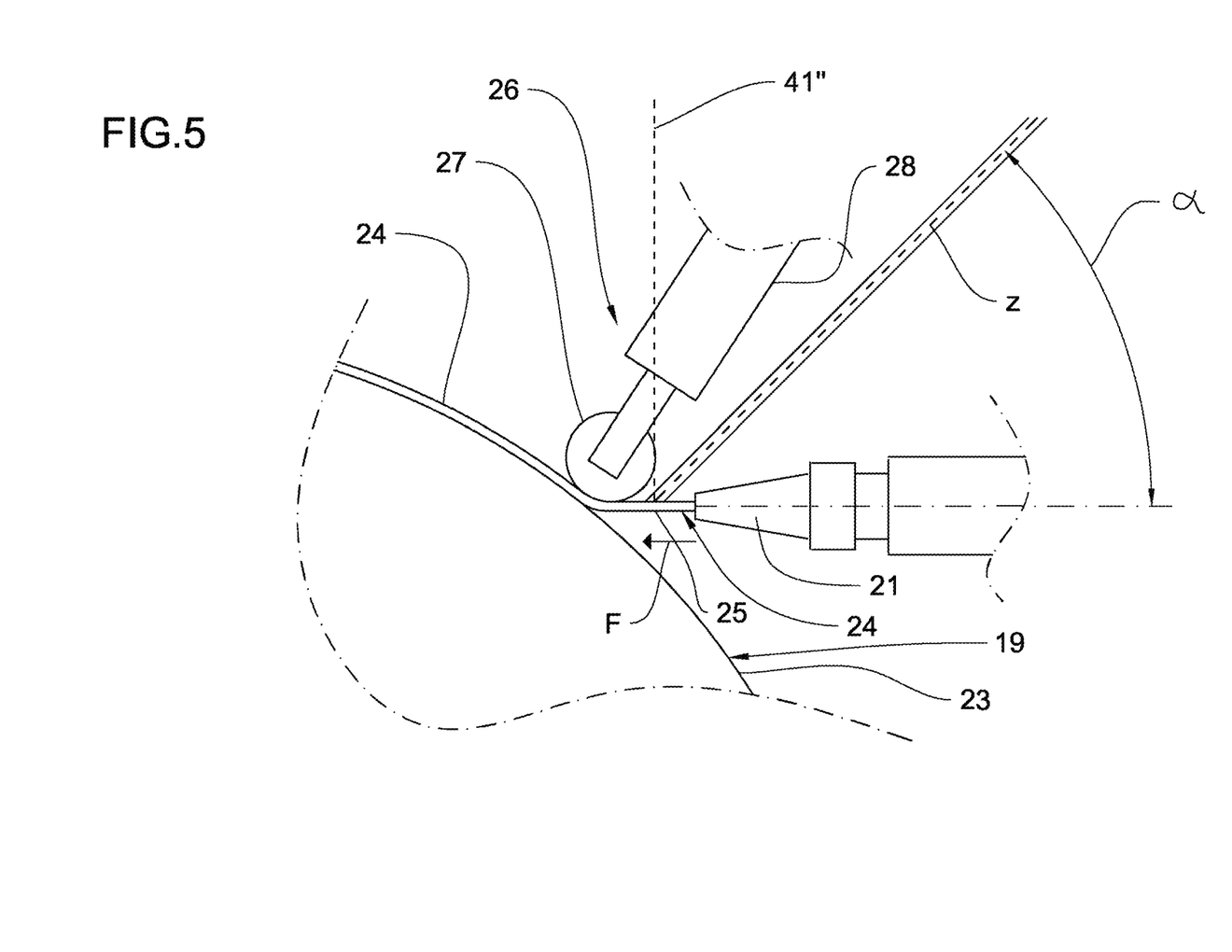
FIG. 5 illustrates an enlargement of the portion of FIG. 3.

A dispensing head 21 or opening of an extruder 22 is placed in proximity to a radially outer surface 23 of the forming drum 19 (FIGS. 3 and 5). The dispensing head 21 is configured for continuously dispensing a continuous elongated element 24 up to a first contact area of said continuous elongated element 24 with the radially outer surface 23 of the forming drum 19 or of a tyre being processed carried by said forming drum 19, while the motor 20 makes the forming drum 19 rotate around the rotation axis "X" in a manner so as to wind the continuous elongated element 24 on the abovementioned radially outer surface. Preferably, such winding occurs according to side-by-side coils. Preferably, such winding occurs according to coils that are side-by-side and/or at least partially radially superimposed.

As is visible in particular in FIG. 5, the dispensing head 21 has a dispensing direction incident with the radially outer surface 23 of the forming drum 19 and at a distance, measured along said dispensing direction, of a few centimetres from the forming drum 19, so that a section 25 of the abovementioned continuous elongated element 24 interposed between the dispensing head 21 and the first contact area has a length of a few centimetres, e.g. 25 mm-30 mm. A design width of the continuous elongated element is for example about 20 mm.

An applicator device 26 comprises a pressing element 27, which in the illustrated example is a roller, operatively active in the first contact area. The applicator device 26 also comprises an actuator, for example hydraulic or pneumatic, not illustrated, configured for pressing the roller 27 against a portion of the continuous elongated element 24 placed immediately downstream of said section 25 and then for pressing said portion against the radially outer surface while the continuous elongated element 24 is deposited on the tyre being processed. A support 28 of the roller 27 extends along a direction that is substantially radial in moving away from the forming drum 19 and partially above the dispensing head 21 (FIG. 3).

The apparatus 14 comprises a control device operatively active between the dispensing head 21 and the first contact area and configured for checking a width of the continuous elongated element 24 before its deposition on the tyre being processed.

The control device comprises (FIGS. 3 and 4) a first and a second emitter 29', 29" of laser light and a camera CCD 30 supported by a support frame 31 which, in the illustrated exemplifying embodiment, is mounted on the extruder 22. The emitters 29', 29" of laser light and the camera CCD 30 are directed towards an upper face (i.e. further away from the ground on which said extruder 22 lies) of the continuous elongated element 24.

With respect to the feeding direction "F" of the continuous elongated element 24 along said section 25, the emitters 29', 29" of laser light are interposed between the dispensing head 21 and the first contact area. The emitters 29', 29" are also radially more external than the dispensing head 21 with respect to the rotation axis "X" of the forming drum 19.

The camera CCD 30 is positioned upstream of the dispensing head 21, with respect to an advancing sense of the continuous elongated element along said section 25, and is radially more external than the dispensing head 21 with respect to the rotation axis "X" of the forming drum 19.

More in detail, the support frame 31 has a pair of uprights 32 which are extended from the extruder 22 and which support a first rod 33. The first rod 33 extends along a direction parallel to the abovementioned section 25 of the continuous elongated element and has a terminal end situated above the first contact area and the roller 27. A second rod 34 is transversely mounted on the terminal end of the first rod 33 and carries, at each opposite ends thereof, one of the emitters 29', 29" of laser light.

The camera 30 is installed between the two uprights 32 and can be moved and blocked in order to adjust the position thereof along a curved path by means of a first adjustment device 35 which comprises two pins 36 constrained to the camera 30 and inserted in respective slots 37, of which only one is visible in FIG. 3. In this manner, it is always possible to maintain the camera 30 pointed on the reflected image. As is visible in FIG. 3, the camera 30 is radially more external than the applicator element 26 with respect to the rotation axis.

Second adjustment devices 38 allow adjusting the position of the emitters 29', 29" of laser light. The second adjustment devices 38 comprise a first body 39 slidably engaged on the first rod 33 such that it can be blocked. The first body 39 carries the second rod 34. Second bodies 40 are slidably engaged, such that they can be blocked, on the second rod 34. Each of the emitters 29', 29" is pivoted to the respective second body 40 around a respective axis parallel to the first rod 33 in a manner so as to be able to adjust the angular position thereof. As is visible in FIG. 4, the emitters 29', 29" are placed on opposite sides of the applicator device 26.

A control unit "CU", schematically represented in FIG. 4, is operatively connected to the emitters 29', 29" and to the camera 30 in order to manage the operation thereof.

The emitters 29', 29" respectively emit a first laser beam 41' and a second laser beam 41" along a respective first and second emission direction Y', Y" directed towards the section 25 of the continuous elongated element 24. As is visible in FIG. 4, the first and second emission direction Y', Y" are symmetric with respect to a said section 25. Each of said first and second laser beam 41', 41" opens as a fan, is flat and extends transversely with respect to a feeding direction "F" of the continuous elongated element 24 along said section 25. In other words, the first and second emission direction Y', Y" lie in a plane perpendicular to the feeding direction "F" of the continuous elongated element 24 along said section 25.

In the illustrated preferred embodiment (FIGS. 6 and 7), the first and the second laser beam 41', 41" intercept the section 25 so as to generate, on the upper face of said section 25, a reflected image formed by a first transverse line 42 and by a second transverse line 43 which each terminate at a respective first and second lateral longitudinal edge of the continuous elongated element 24. In other words, the two laser beams 41', 41" encounter the continuous elongated element 24 without intersecting, so as to give rise to the two separate transverse lines 42, 43 (FIG. 7).

Figure 6:
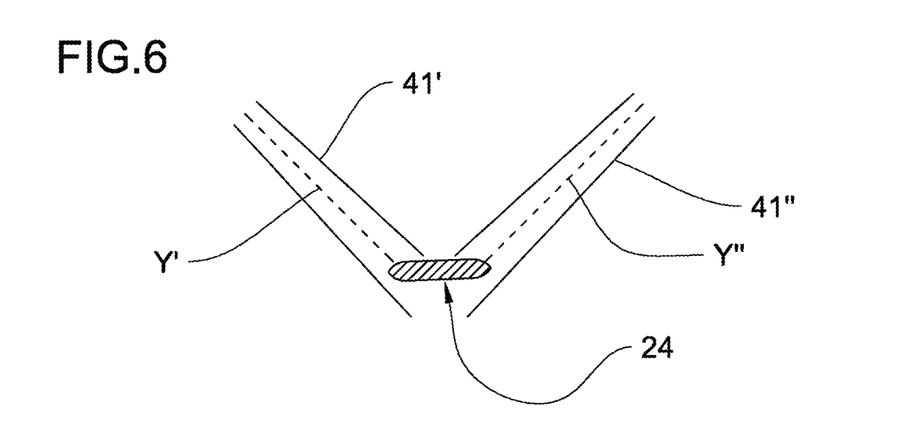
FIG. 6 illustrates a section of an elongated element during the deposition on a forming drum performed in the apparatus of FIGS. 3, 4 and 5.
Figure 7:
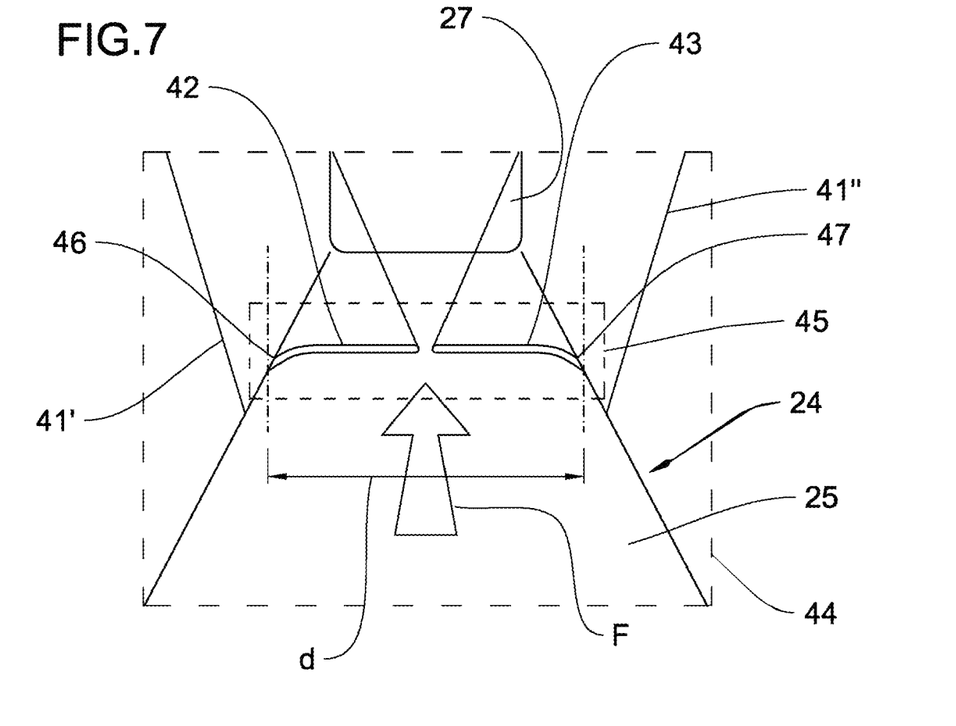
FIG. 7 illustrates a perspective view of the elongated element during the deposition in the apparatus of FIGS. 3, 4 and 5.

As can be observed in FIG. 6, the continuous elongated element 24 has a cross section of lenticular form with tapered opposite edges, and each of the first and second emission directions Y', Y" impinges on the respective lateral longitudinal edge perpendicular thereto (FIG. 6).

The camera 30 is pointed towards the reflected image formed by the first transverse line 42 and by the second transverse line 43 in order to acquire said image along an acquisition direction "Z" (FIGS. 3 and 5). The acquisition direction "Z" lies in an acquisition plane perpendicular to an advancement plane of the continuous elongated element 24 and parallel to the feeding direction "F" of the continuous elongated element 24 along said section 25. The acquisition direction "Z" is tilted with respect to the advancement plane of the continuous elongated element 24 by an angle "α", preferably by about 45° (FIG. 5). The Applicant observes that the camera 30 sees the section 25 of the continuous elongated element 24 in perspective view as a trapezoid, according to that illustrated in FIG. 7, both due to the aforesaid tilt, and due to the stretch effect along the feeding direction "F" that the continuous elongated element sustains between the dispensing head 21 and the first contact area with the radially outer surface of the tyre being processed.

The acquisition direction "Z" passes between the dispensing head 21 and the applicator device 26. The first and second emission direction Y', Y" and the acquisition direction "Z" are therefore tilted with respect to each other.

The camera 30 frames a coverage area 44 which at least partly contains said section 25. An analysed area 45, as described hereinbelow, is contained in said coverage area 44. The analysed area 45 contains the reflected image formed by the first transverse line 42 and by the second transverse line 43.

The control unit "CU" is configured for detecting, through the camera 30, a first parameter "d1(t)" related to the reflected image formed by the first transverse line 42 and by the second transverse line 43 and for comparing the first parameter "d1(t)" with a second reference parameter "d2".

As is visible in FIG. 7, the image formed by the first transverse line 42 and by the second transverse line 43 comprises a first end 46 lying on one of the longitudinal edges and belonging to the first transverse line 42 and a second end 47 lying on the other of the longitudinal edges and belonging to the second transverse line 43.

The abovementioned first parameter "d1(t)" is the distance "d" between said first and second end 46, 47 detected along a fixed horizontal direction (in a reference system of the camera 30), in which the horizontal direction is perpendicular to parallel and vertical reference straight lines, each passing through one of the two ends 46, 47 (FIG. 7). The abovementioned first parameter "d1(t)" is the distance "d" continuously detected during the deposition of the continuous elongated element 24 starting from an instant after a first startup time interval "t1" for the stabilization of the value of said distance "d".

The second parameter "d2" is the reference value of the distance "d" that was previously acquired, as will be better illustrated hereinbelow, during a controlled cycle, in which the value of said distance "d" is certainly within the prescribed tolerances since it was produced under controlled conditions (dispensing head 21 or opening of the extruder 22 in nominal or clean conditions).

More in detail, in accordance with the process and the method of the present invention, the operator, before starting the deposition of the continuous elongated element 24 on the forming drum 19, visually controls that the dispensing head 21 is not obstructed or partially obstructed. If everything is ok, the dispensing of the continuous elongated element 24 is started, along with the rotation of the forming drum 19. In addition, the emitters 29', 29" of laser light and the camera 30 are activated and the camera 30 starts acquiring the reflected image (first transverse line 42 and second transverse line 43). The control is therefore carried out in real time.

Figure 8:
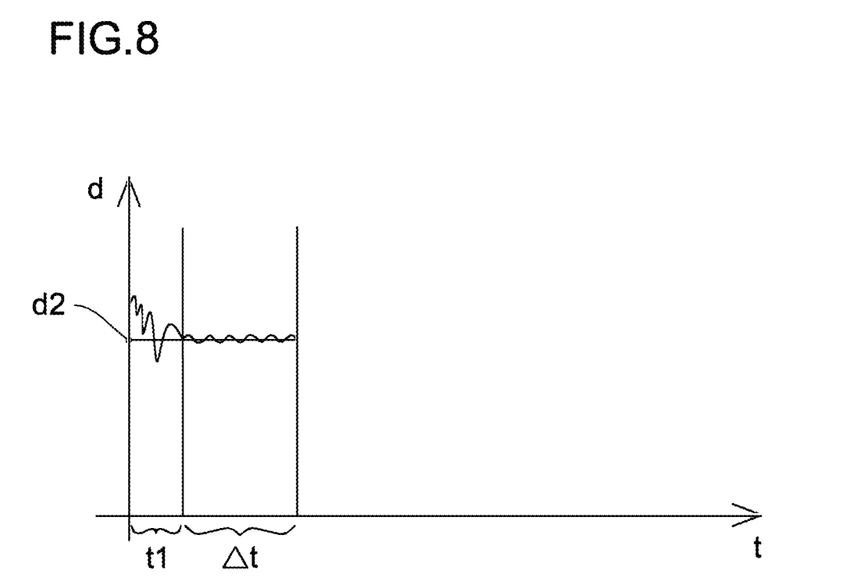
FIG. 8 is a graph which illustrates the obtainment of a reference parameter.
Figure 9:
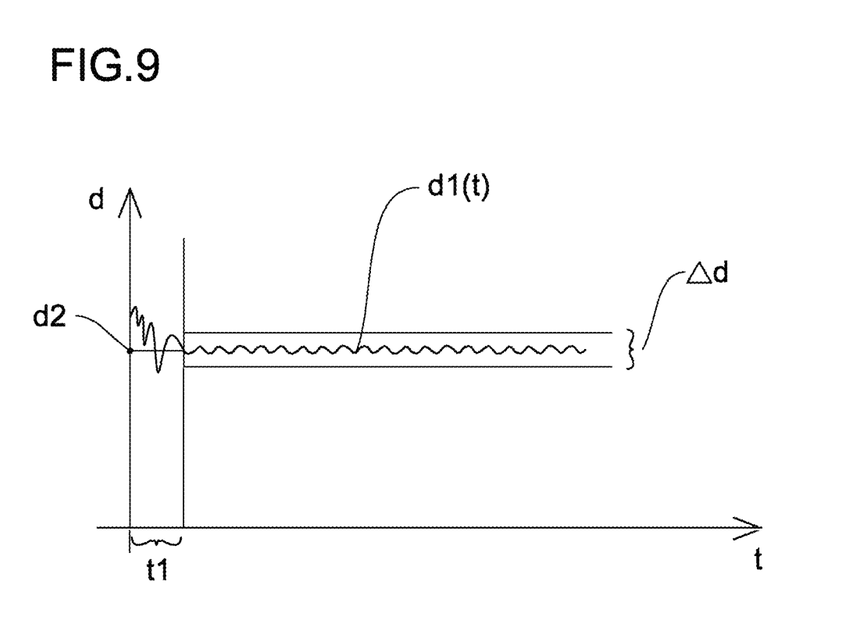
FIG. 9 is a graph which illustrates the progression of a parameter detected during the process for making tyres for vehicle wheels in the plant of FIG. 1.
Figure 10:
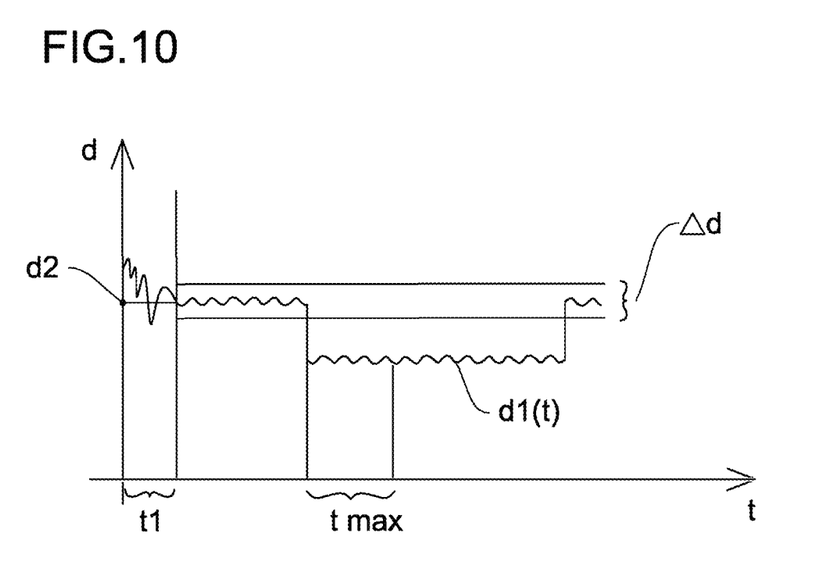
FIG. 10 illustrates a different progression of the parameter of FIG. 9.

In a very first step (startup interval "t1" of several seconds according to that indicated in FIGS. 8-10), before a head end of the continuous elongated element 24 reaches under the roller 27, the geometry and the width of said continuous elongated element 24 sustain variations that are not taken under consideration.

In a subsequent first time interval "Δt", the control unit "CU" through the camera 30 detects the distance "d", calculates the average value thereof and stores it as said second parameter "d2" (FIG. 8).

The calculation of the aforesaid parameter d2 is made upon manual command of the operator, or automatically upon changing recipe for the elastomeric material, since the procedures in this case also provide for the cleaning of the dispensing head 21 or of the opening of the extruder 22.

During the normal building step, i.e. after having stored the aforesaid second parameter "d2" and once again started the deposition of the continuous elongated element 24 on the tyre being processed, following the startup interval "t1", the control unit "CU" through the camera 30 detects the first parameter "d1(t)" and checks if the first parameter "d1(t)" falls within a tolerance range "Δd" placed around the second parameter "d2". The control carried out is therefore of relative type since the reference measurement is the distance "d" detected during a controlled cycle in which the width of the continuous elongated element 24 is certainly that desired. The value of the tolerance range "Δd" is set in the control unit "CU" and can for example be changed by the operator.

If the first parameter "d1(t)" exits from the tolerance range "Δd", the control unit "CU" also checks if the stay of such first parameter "d1(t)" outside the tolerance range "Δd" exceeds a period of time longer than a preset value "tmax"; the latter can also be set, for example as a function of the dispensing speed.

The control unit "CU" drives a signalling device (e.g. a LED lamp or acoustic signalling device) which emits a first alert signal each time that the first parameter "d1(t)" exits from the tolerance range "Δd", independent of the stay time and without stopping the deposition.

If instead the stay of the first parameter "d1(t)" outside the tolerance range "Δd" exceeds the preset value "tmax" one or more times, then at the end of the deposition the control unit "CU" drives, for example, a further signalling device that emits a second alert signal which indicates the non-compliance of the tyre just built.

In addition, from the start of the dispensing and of the acquisition, the progression of the distance "d" is recorded in a file preferably saved in a database which contains the records of the measurements carried out during the depositions. If the stay of the first parameter "d1(t)" outside the tolerance range "Δd" exceeds the abovementioned preset value "tmax" one or more times, the respective file is marked (e.g. by giving it a suitable name) as non-compliant.

This for a quick and targeted search of the cycles that are not compliant from among the thousands of saved cycles.

For example, the continuous elongated element 24 has a design width of 20 mm. After the start time interval "t1", the control unit "CU" through the camera 30 detects the distance "d" and compares it with the second parameter "d2" previously stored during a controlled cycle, as illustrated above.

Such second parameter "d2" is for example 100 pixel which corresponds to about 19 mm. The difference between the weight value taken as average (19 mm) and the design value (20 mm) depends on the acceptable variability of the process and for example on pulses determined by the meshing of the teeth of the gear pump of the extruder 22.

The value of the tolerance range "Δd" preset in the control unit "CU" can for example be +/−5 pixel (or +/−5% of "d2") which corresponds with +/−0.95 mm.

FIG. 9 illustrates the progression of the first parameter "d1(t)" which remains within the tolerance range "Δd". The respective file will be marked as compliant.

In FIG. 10, instead, the first parameter "d1(t)" exits from the tolerance range "Δd" for a time greater than the preset value "tmax", which for example is about 2 s, before returning. For example, the first parameter "d1(t)" detected is 17 mm for 8 s, i.e. the continuous elongated element is narrower than that tolerated. In this case, the control unit "CU" emits the first alert signal and also the second alert signal at the end of the deposition. The respective file will be marked as non-compliant.

The tyre can, for example, be controlled by the operator who judges if the tyre is actually not acceptable or brought, through automated devices, into an area intended for a more in-depth control, or the tyre can be directly discarded.

In an embodiment variant, provision is made for stopping the dispensing and discarding the tyre as soon as the control unit "CU" detects that the first parameter "d1(t)" exited from the tolerance range "Δd" for a time greater than the preset value "tmax".

What is claimed is:

1. An apparatus for building a tyre for vehicle wheels, comprising:
   a forming drum configured to rotate around a rotation axis thereof;
   a dispensing head located at said forming drum and configured to continuously dispense a continuous elongated element up to an area of first contact of said continuous elongated element with a radially outer surface of a tyre being processed carried by said forming drum;
   a motor connected with the forming drum for setting the forming drum into rotation around said rotation axis to wind the continuous elongated element on said radially outer surface in a side-by-side and/or radially superimposed coiled configuration; and
   a control device operatively active between the dispensing head and the area of first contact,
   wherein
   i) the control device comprises:
      at least one emitter of at least one beam of electromagnetic radiation facing towards a section of the continuous elongated element,
      at least one sensor facing towards said section and configured to detect at least one radiation reflected by said section, and
      a control unit operatively connected at least to said at least one sensor and configured to determine a first parameter related to a geometrical dimension of the continuous elongated element and to compare said first parameter with a second, reference, parameter;
   ii) said at least one sensor, by detecting said at least one reflected radiation, acquires at least one image of said at least one radiation reflected by said section;
   iii) said at least one beam intercepts lateral longitudinal edges of the continuous elongated element and said at least one image comprises two ends corresponding to said lateral longitudinal edges, the first parameter being related to a distance between said two ends;
   iv) said at least one emitter is a light radiation projector and said at least one sensor comprises a camera; and
   v) said at least one beam of electromagnetic radiation is substantially flat and extends transversely with respect to a feeding direction of the continuous elongated element along said section, whereby said image is substantially defined by at least one transverse line.

2. The apparatus according to claim 1, wherein, with respect to the feeding direction of the continuous elongated element along said section, the at least one emitter is interposed between the dispensing head and the area of first contact.

3. The apparatus according to claim 1, wherein said at least one sensor is radially more external than the dispensing head with respect to said rotation axis.

4. The apparatus according to claim 3, wherein said at least one sensor is positioned upstream of said dispensing head with respect to the feeding direction of the continuous elongated element along said section.

5. The apparatus according to claim 1, wherein said at least one emitter is radially more external than the dispensing head with respect to said rotation axis.

6. The apparatus according to claim 1, wherein said at least one emitter comprises a first emitter and a second emitter, respectively facing towards a first lateral longitudinal edge and towards a second lateral longitudinal edge of the continuous elongated element.

7. The apparatus according to claim 1, further comprising an applicator device comprising a pressing element operatively active in the area of first contact, the pressing element being configured to press a portion of the continuous elongated element against the radially outer surface while the dispensed continuous elongated element is deposited on the tyre being processed.

8. The apparatus according to claim 7, wherein the at least one emitter comprises a first emitter and a second emitter placed on opposite sides of the applicator device.

9. The apparatus according to claim 7, wherein said at least one sensor defines an acquisition direction of the image, the acquisition direction passing between the dispensing head and the applicator device.

10. The apparatus according to claim 1, wherein said lateral longitudinal edges are lateral longitudinal edges of said section of the continuous elongated element.

11. The apparatus according to claim 10, wherein said at least one beam comprises a first beam and a second beam respectively intersecting a first lateral longitudinal edge and a second lateral longitudinal edge of said lateral longitudinal edges.

12. The apparatus according to claim 11, wherein said first parameter is related to a distance between said first lateral longitudinal edge and said second lateral longitudinal edge.

13. An apparatus for building a tyre for vehicle wheels, comprising:
    a forming drum configured to rotate around a rotation axis thereof;
    a dispensing head located at said forming drum and configured to continuously dispense a continuous elongated element up to an area of first contact of said continuous elongated element with a radially outer surface of a tyre being processed carried by said forming drum;
    a motor connected with the forming drum for setting the forming drum into rotation around said rotation axis to wind the continuous elongated element on said radially outer surface in a side-by-side and/or radially superimposed coiled configuration; and
    a control device operatively active between the dispensing head and the area of first contact;
    wherein
        i) the control device comprises:
            at least one emitter of at least one beam of electromagnetic radiation facing towards a section of the continuous elongated element,
            at least one sensor facing towards said section and configured to detect at least one radiation reflected by said section, and
            a control unit operatively connected at least to said at least one sensor and configured to determine a first parameter related to a geometrical dimension of the continuous elongated element and to compare said first parameter with a second, reference, parameter;
        ii) said sensor, by detecting said at least one reflected radiation, acquires at least one image of said at least one radiation reflected by said section; and
        iii) said at least one beam of electromagnetic radiation is substantially flat and extends transversely with respect to a feeding direction of the continuous elongated element in said section, whereby said image is substantially defined by at least one transverse line.

* * * * *